United States Patent
Inada et al.

[11] 3,920,279
[45] Nov. 18, 1975

[54] ANTI-SKID BRAKE CONTROL ASSEMBLY OF THE DIAPHRAGM TYPE

[75] Inventors: Masami Inada, Toyoake; Masamoto Ando, Toyohashi, both of Japan

[73] Assignee: Aisin Seiki Kabushiki Kaisha, Aichi, Japan

[22] Filed: May 24, 1974

[21] Appl. No.: 473,082

[30] Foreign Application Priority Data
May 24, 1973 Japan.................. 48-06137

[52] U.S. Cl.................. 303/21 F; 92/98 D; 92/99
[51] Int. Cl.²................ B60T 8/02; F16J 3/02
[58] Field of Search.............. 303/21 F, 61–63, 303/68–69; 188/181 A; 92/97, 99, 98 R, 98 D; 251/61.2

[56] References Cited
UNITED STATES PATENTS

| | | | |
|---|---|---|---|
| 3,368,459 | 2/1968 | French et al. | 92/97 X |
| 3,556,609 | 1/1971 | MacDuff | 303/21 F |
| 3,685,867 | 8/1972 | Inada et al. | 303/21 F |
| 3,727,993 | 4/1973 | Schenk | 303/21 F |
| 3,760,693 | 9/1973 | Myers | 92/99 X |
| 3,830,550 | 8/1974 | Kondo | 303/21 F |

Primary Examiner—Trygve M. Blix
Assistant Examiner—Douglas C. Butler
Attorney, Agent, or Firm—Oblon, Fisher, Spivak, McClelland & Maier

[57] ABSTRACT

An anti-skid brake control assembly for vehicles including a casing, two diaphragm members provided in the casing and defining three chambers within the interior of the casing, the first chamber of the three chambers constituted by the casing and one of the diaphragm members being selectively supplied with atmospheric air or vacuum, the second chamber thereof constituted by the two diaphragm members being normally supplied with atmospheric air, and the third chamber thereof constituted by the casing and the other diaphragm member, a cut-off valve operatively connected with the two diaphragm members thereby controlling the fluid communication between the master brake cylinder and wheel brake cylinder, an annular member fixed to the casing at the interior thereof, an outer edge of the other diaphragm member being provided with a flange, the flange being engageable with the annular member such that the movement of the other diaphragm member is limited and guided.

4 Claims, 3 Drawing Figures

ANTI-SKID BRAKE CONTROL ASSEMBLY OF THE DIAPHRAGM TYPE

BACKGROUND OF THE INVENTION

1. Field of the Invention

The present invention relates to an anti-skid brake control assembly for vehicles, and more particularly to an improved anti-skid brake control assembly including diaphragm means to actuate a fluid cut-off valve.

2. Description of the Prior Art

When a wheel lock condition is sensed by sensor, the diaphragm means of a conventional anti-skid brake control assembly is moved to actuate a cut-off valve which is disposed between the master brake cylinder and the wheel brake cylinders. When the wheel lock condition is released, the diaphragm means is again moved. However, in conventional assemblies, no guiding or limiting means have been provided for the diaphragm means. Therefore, an unreliable movement of the diaphragm means which may be subject to torsion, distortion, or deformation can result.

SUMMARY OF THE INVENTION

Therefore, it is an object of this invention to provide an anti-skid brake control assembly wherein reliable movement of the diaphragm means may be accomplished.

It is another object of this invention to provide an anti-skid brake control assembly wherein outer edges of the diaphragm means thereof may be easily and securely sealed.

It is a further object of this invention to provide an anti-skid brake control assembly which is of good lasting quality, simple in construction, and inexpensive in manufacture.

Briefly, in accordance with the present invention, the foregoing and other objects are attained by an anti-skid brake control assembly for vehicles including a casing, two diaphragm members provided in the casing and defining three chambers within the interior of the casing, the first chamber of the three chambers constituted by the casing and one of the diaphragm members being selectively supplied with atmospheric air or vacuum, the second chamber thereof constituted by the two diaphragm members being normally supplied with atmospheric air, and the third chamber thereof constituted by the casing and the other diaphragm member, a cut-off valve operatively connected with the two diaphragm members thereby controlling the fluid communication between the master brake cylinder and wheel brake cylinder, an annular member fixed to the casing at the interior thereof, an outer edge of the other diaphragm member being provided with a flange, the flange being engageable with the annular member such that the movement of the other diaphragm member is limited and guided.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE INVENTION

Figure 1:
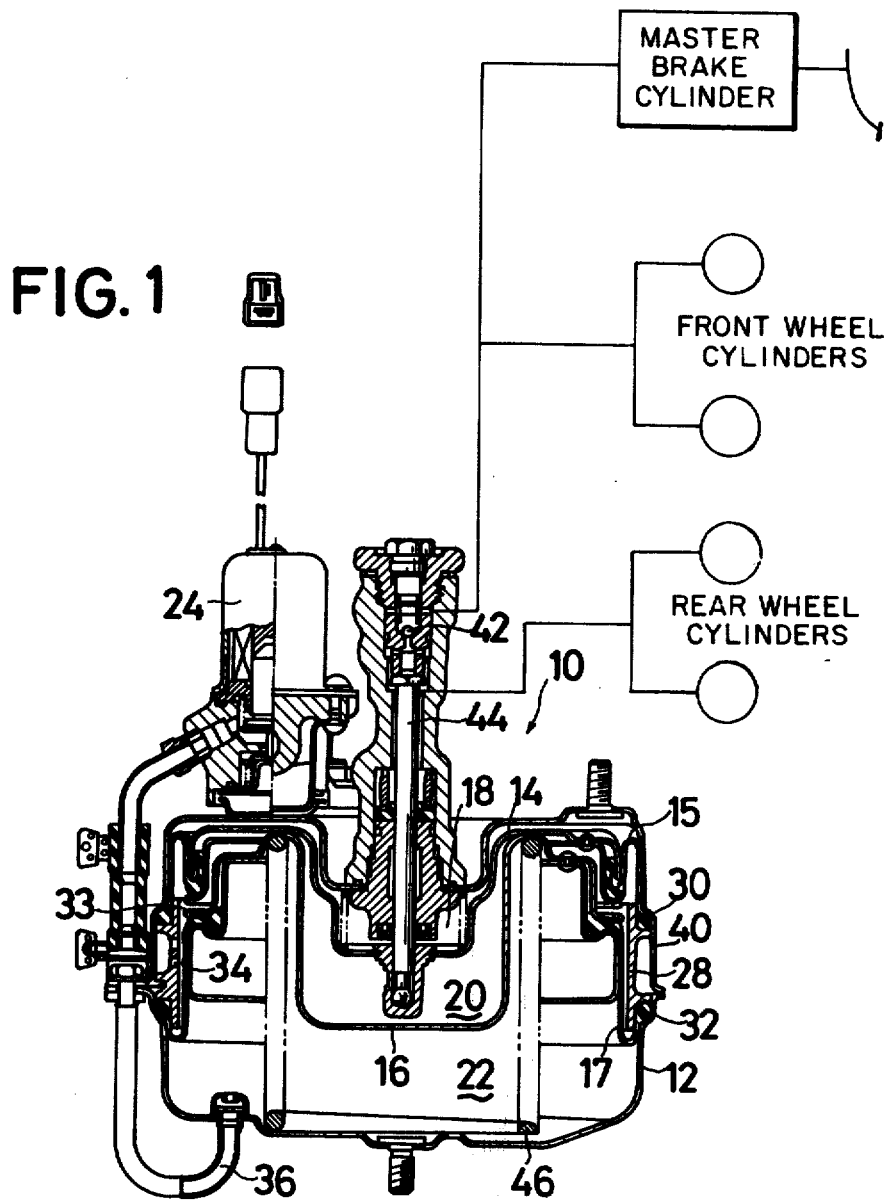
FIG. 1 is a slide elevational view of an anti-skid brake control assembly according to the present invention.

Referring now to the drawings, and more particularly to FIG. 1 thereof, an anti-skid brake control assembly is indicated generally by the reference numeral 10. The control assembly 10 includes a casing 12 secured to a stationary member of the vehicle (not shown), a first diaphragm member 14 having a rubber seal 15 at the outer periphery thereof, and a second diaphragm member 16 having a rubber seal 17 at its outer periphery. Each of the diaphragm members is constructed of metal such as, for example, aluminum, or may be constructed of a synthetic resin. Thus, a first chamber 18 is defined by the casing 12 and the first diaphragm member 14, a second chamber 20 is defined by the first and second diaphragm members 14 and 16, and a third chamber 22 is defined by the second diaphragm member 16 and the casing 12. An electro-magnetic valve 24 is fixed to the casing 12 in order to selectively supply atmospheric air or vacuum to the first chamber 18 through a valve means 26 of another electro-magnetic valve 27.

An annular member 28 is fixed to the casing 12. Outer edges 30 and 32 of the first and second rubber members 15 and 17 are fixed between the annular member 28 and the casing 12.

The second diaphragm member 16 is provided with a flange 33, which is engageable with the annular member 28. The inner surface of the annular member 28 is smooth such that the flange 33 is guided by the annular member 28 when the second diaphragm member 16 is moved. Holes 34 and 40 are provided in the annular member 28 and the casing 12 respectively. Therefore, the second chamber 20 is always supplied with atmospheric air. The third chamber 22 is always under vacuum by means of a pipe or conduit 38 which is connected to a proper vacuum source such as, for example, an intake manifold (not shown), as long as such vacuum source is in good condition to supply vacuum.

The control assembly 10 further includes a fluid pressure cut-off valve 42 associated with a piston 44 which is in turn associated with the first diaphragm member 14. The cut-off valve 42 is interposed between the brake master cylinder and the brake wheel cylinders (not shown) for interrupting or reestablishing fluid communication between both of the brake cylinders.

A coil spring 46 is provided between the second diaphragm 15 and the casing 12 such that the piston 44 will be urged to move in the upward direction (FIG. 1) by means of diaphragm members 14 and 16 in the event of failure of the vacuum source. Therefore, when no vacuum is generated, i.e., atmospheric air is supplied to the third chamber 22, the cut-off valve 42 is caused to open by the exerting force of the spring 46 and fluid communication is permitted between the master cylinder and the wheel cylinders.

In operation, when vacuum is created upon actuation of the engine, the second diaphragm member 16 is moved downwardly against the spring 46 due to the pneumatic pressure difference between the second and third chambers 20 and 22. Simultaneously, vacuum is admitted to the first chamber 18 through the electromagnetic valves 24 and 27. Therefore, the first diaphragm member 14 causes the piston 44 to move upwardly such that the cut-off valve 42 is kept open.

Figure 3:
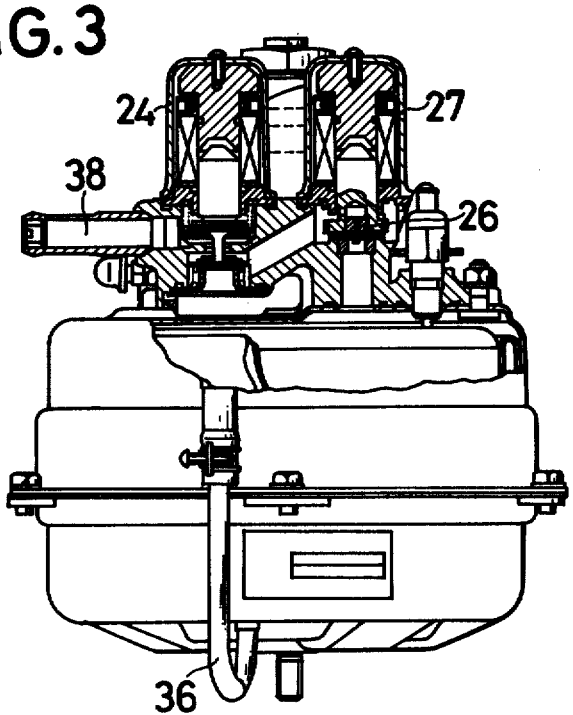
FIG. 3 is an elevation taken along the line 3—3 of FIG. 2.

When a wheel lock condition is sensed, the electromagnetic valve 24 is energized such that atmospheric air is supplied to the first chamber 18. Thus, the first diaphragm member 14 is caused to move downwardly such that the piston 44 is also moved downwardly thereby interrupting fluid communication between the master cylinder and wheel cylinders. The downward movement of the piston 44 results in an increase in capacity of the wheel brake cylinder. Thus, the fluid pressure in the wheel brake cylinders is decreased such that the risk of wheel lock may be avoided. When no risk of wheel lock is generated, the electro-magnetic valve 24 is returned to the position as shown in FIG. 3, thereby admitting vacuum to the first chamber 18. The piston 44 is moved upwardly by the first diaphragm member 14 to thereby increase the fluid pressure of the wheel brake cylinders. As long as vacuum is supplied to the third chamber 22, the second diaphragm 16 is kept in the lowest position wherein the spring 46 is fully compressed by the atmospheric air in the second chamber 20. However, when no vacuum is applied in the third chamber 22 as a result of some condition, for example, in the event of vacuum source failure or piping leakage, the second diaphragm 16 is urged to move upwardly and is guided at the flange portion 33 thereof by the annular member 28. More specifically, a radial movement of the second diaphragm member 16 is limited and the vertical movement thereof is guided by engagement of the flange 33 and the inner surface of the annular member 28. Therefore, the second diaphragm can be moved smoothly and reliable anti-skid brake operation is realized.

Figure 2:
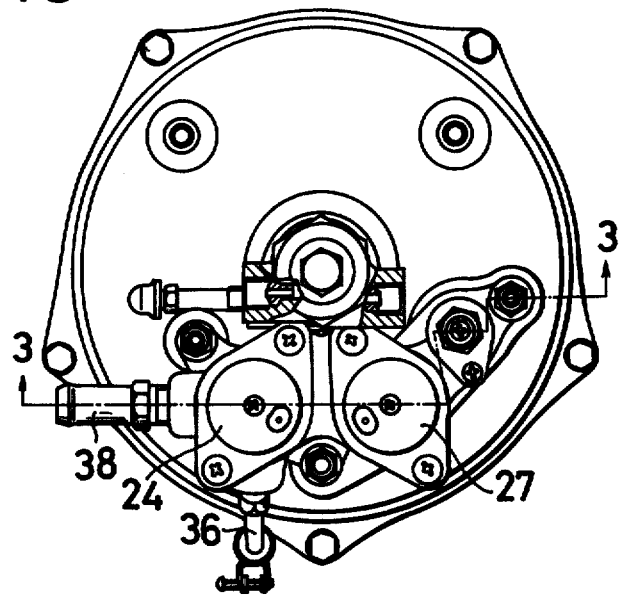
FIG. 2 is a partial front elevational view of the assembly of FIG. 1.

Although the invention was described according to the embodiment shown in FIGS. 1–3 in which two diaphragm members 14, 16 are provided, the invention is applicable also to an anti-skid brake control assembly in which only one diaphragm member is provided. In this embodiment, the interior of the casing of the assembly is divided into two chambers by the diaphragm member, one of the chambers is supplied selectively with atmospheric air or vacuum, and the other chamber is normally supplied with vacuum. The outer periphery of the rubber portion of the diaphragm member is sealed by the annular member and the outer periphery of the metal or synthetic resin diaphragm member is provided with a flange which is engageable with the inner periphery of the annular member. The operation of this embodiment is essentially the same as the foregoing embodiment, and is known to the ordinary skilled person such that the description thereof may be omitted.

Obviously, numerous modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. In an anti-skid brake control assembly for vehicles including a casing, two diaphragm members provided in said casing and defining three chambers within the interior of said casing, the first chamber of said three chambers constituted by said casing and one of said diaphragm members being selectively supplied with atmospheric air or vacuum, the second chamber thereof constituted by said two diaphragm members being normally supplied with atmospheric air, and the third chamber thereof constituted by said casing and the other of said diaphragm members, a cut-off valve operatively connected with said two diaphragm members thereby controlling the fluid communication between the master brake cylinder means and wheel brake cylinder means, the improvement comprising an annular member fixed to said casing at said interior thereof, an outer edge of said other diaphragm member being provided with a flange, said flange being engageable with said annular member whereby the movement of said other diaphragm member is limited and guided.

2. An anti-skid brake control assembly as set forth in claim 1, wherein each edge of said annular member is sealed by said two diaphragm members, said annular member being provided with aperture means, and said casing being provided with aperture means at the portion between said two diaphragm members whereby said second chamber is normally supplied with atmospheric air.

3. An anti-skid brake control assembly as set forth in claim 1, wherein said annular member and said flange of said other diaphragm member being made of metal whereby the movement of said other diaphragm member is limited and guided by metallic engagement between said annular member and said flange.

4. In an anti-skid brake control assembly for vehicles including a casing, a diaphragm member provided in said casing and defining two chambers within the interior of said casing, one of said chambers being supplied selectively with atmospheric air or vacuum while the other chamber is normally supplied with vacuum, a cut-off valve operatively connected with said diaphragm member thereof controlling the fluid communication between the master brake cylinder means and wheel brake cylinder means, the improvement comprising:
an annular member fixed to said casing at said interior thereof, an outer portion of said diaphragm member being provided with a flange, said flange being engageable with said annular member whereby the movement of said diaphragm member is limited and guided; and
a seal member secured at the inner periphery thereof to said outer portion of said diaphragm member, the outer periphery of said seal member being secured between said annular member and said casing,
whereby movement of said diaphragm causes a corresponding movement of the body portion of said seal member, intermediate said peripheral portions, along said casing.

* * * * *